United States Patent [19]
Jeong

[11] Patent Number: 5,684,781
[45] Date of Patent: Nov. 4, 1997

[54] OPTICAL PICKUP FOR RECORDING/REPRODUCING DOUBLE-SIDED DISC

[75] Inventor: Yeon-Cheol Jeong, Incheon, Rep. of Korea

[73] Assignee: Daewoo Electronics Co., Ltd., Seoul, Rep. of Korea

[21] Appl. No.: 579,013

[22] Filed: Dec. 27, 1995

[30] Foreign Application Priority Data

Dec. 27, 1994 [KR] Rep. of Korea ............... 94-37242

[51] Int. Cl.$^6$ .................................................. G11B 7/00
[52] U.S. Cl. ................................. 369/112; 369/44.38
[58] Field of Search ............................ 369/112, 109, 369/110, 111, 99, 120, 44.37, 44.38

[56] References Cited

U.S. PATENT DOCUMENTS

| | | | |
|---|---|---|---|
| 4,667,316 | 5/1987 | Suda et al. | 369/110 |
| 4,771,413 | 9/1988 | Nago | 369/109 |
| 4,959,822 | 9/1990 | Pasman et al. | 369/109 |
| 5,339,300 | 8/1994 | Akatsuka et al. | 369/44.38 |

*Primary Examiner*—Loha Ben
*Attorney, Agent, or Firm*—Beveridge, DeGrandi, Weilacher & Young LLP

[57] ABSTRACT

To record/reproduce a double-sided disc, in an optical pickup, a first and a second laser beams spaced each other are irradiated from a first and a second laser sources toward a square pillar-shaped prism. The two laser beams are reflected from two neighboring faces of a longitudinal direction of the square pillar-shaped prism respectively, toward opposite directions from each other. The reflected beams respectively proceed to recording faces of the double-sided disc which are to be disposed opposite to each other with the square pillar-shaped prism in the center. The beams reflected from the recording faces of the double-sided disc are returned to the prism. The returned beams are received on a first and a second photodetector, and thereby, record/reproduction of information and tracking and focusing are carried out.

8 Claims, 2 Drawing Sheets

OPTICAL PICKUP FOR RECORDING/ REPRODUCING DOUBLE-SIDED DISC

BACKGROUND OF THE INVENTION

1. Field of the Invention

The present invention relates to an optical pickup for recording/reproducing a double-sided disc, and more particularly to an optical pickup for recording/reproducing a double-sided disc capable of easily recording/reproducing a double-sided disc on both faces of which signals are recorded.

2. Description of the Prior Art

Information reproducing/recording systems for using optical discs such as laser discs or compact discs have been developed in recent days. Higher data densities are desirable for a variety of reasons, including the ability to make compact discs smaller and to enable the recording of High Definition Television (HDTV) compatible video discs.

One method considered possible for achieving a high data density in an optical data medium was to focus the read laser to an even finer beam diameter, but the maximum practical limit to the numerical aperture (NA) of an objective lens which focuses the laser is approximately 0.6. It would also be possible to obtain a similar result by shortening the laser wavelength, but a wavelength of a practical semiconductor laser is limited at the present.

A second method for achieving a high density is to use V-grooves in the optical disc, such as disclosed in U.S. Pat. No. 4,569,038 issued to Nagashima et al. (Feb. 4, 1986).

The capacity of the data recordable on an optical disc using conventional technologies is determinable. For an optical disk housed in a 3.5 inch cassette case, the disc diameter is approximately 86 mm, providing a data storage area with a radius of 25 mm to 41 mm. It is assumed that a 670 nm wavelength laser is used with a 0.55 NA objective lens. With a 0.8 µm track pitch (1.6 µm V-groove pitch) and 0.47 µm bit length, the unformatted single-side capacity is 1.1 Gbytes. Using the standard CD format, a single-side formatted capacity of 550 Mb, the same as a 12 cm CD, can be obtained.

If information conventionally provided as printed material is to be provided in the future on a CD-ROM or other optical data medium, it will also be necessary and convenient if the user is able to write on the medium to record notes as is done currently with paper media, instead of only being able to read the information. One method which makes this possible divides the disc into a read/writable areas, wherein a recording film is formed on the inside portion of the disc, and a read-only data area comprising a reflective metal film on the outside portion of the disc. However, this method reduces the read-only data area, and therefore limits the amount of information distributable on a single disc.

As thus described, while smaller, higher capacity optical data media, including optical discs and cards, are desirable.

A double-sided optical disc having the recording layers on both sides thereof and an optical disc having a plurality of information storage layers have been developed to improve the density of information stored per unit area of the disc. Furthermore, an optical pickup for recording/reproducing such a double-sided optical disc or an optical disc having a plurality of information storage layers has been developed.

Meanwhile, the conventional optical pickup for recording/reproducing such an optical disc is shown in U.S. Pat. No. 4,797,866, etc.

The conventional optical pickup for recording/ reproducing an optical disc will be described in detail with reference to FIG. 1 below.

FIG. 1 is a schematic view of the conventional optical pickup. A light source is a laser diode 10 for generating a laser beam for recording/reproducing information on/from an optical disc D. The laser beam from laser diode 10 is converted into parallel rays through a collimator lens 11. The beams converted into the parallel rays by collimator lens 11 sequentially pass through a beam splitter 12 and an objective lens 14 to be incident to the surface of optical disc D with a beam spot of approximately 1 µm diameter.

Here, beam splitter 12 is provided in such a manner that two right-angled prisms are installed opposite to each other along respective inclination planes of 45°, and a coating layer 13 is formed along the contacting portion of the prisms, thereby securing the incident beam to travel straight path, while some of the incident beam are transmitted and the other incident beam are reflected at a right angle with respect to the incident beam.

After the laser beam which is straightly transmitted through beam splitter 12 is focused on the data recording surface of optical disc D, then the beam is reflected from disc D to be returned to beam splitter 12 via objective lens 14. The returned beam is reflected by beam splitter 12 to be bent through 90°. The laser beam reflected at the right angle by beam splitter 12 focuses while passing through a focusing lens 15 installed along an optical path of the reflected light, and the lower half of the beam focused by focusing lens 15 is cut by knife edge 16. Thereafter, only the upper half of the beam is received into light-receiving diode 17. This light-receiving diode 17 is two, four or six-division light-receiving diode. Using an image formed by the beam received into light-receiving diode 17, a positional accuracy, i.e., focusing error and tracking error, of the optical pickup with respect to optical disc D is detected.

On the basis of the amount of the reflected lights determined by pits of optical disc D, the focusing and tracking and the reproduction of the information are carried out.

When carrying out recording and reproduction of information on the double-sided optical disc using the above-mentioned optical pickup, after reproduction of one side of the disc is completed, it is necessary to turn the disc on the turntable or transfer the optical pickup to the upper and lower sides of the disc in order to reproduce the other recording surface. That is, either the apparatus for transferring the disc to the upper and lower sides of the optical pickup or the apparatus for transferring the optical pickup to the upper and lower sides of the disc is required.

Thus, for example, U.S. Pat. No. 4,839,881 (Jun. 13, 1989) issued by Takahara et al. proposes an optical double-sided disc having the recording layers on both sides thereof and an optical disc player which has a pickup transport device with a U-shaped guide assembly, the optical disc player completing recording and/or reproducing information of the disc by guiding a pickup along upper and lower surfaces of the double-sided disc by the pickup transport device with the U-shaped guide assembly.

However, according to the optical disc player having the U-shaped guide assembly, reproduction errors are frequently generated since it is easy for the optical pickup to be shaken and has impacts during transfer of the optical pickup, and thereby the reproduction accuracy is sharply decreased, and the devices get damaged.

Furthermore, the optical disc player having the U-shaped guide assembly is complicated in construction, thereby the miniaturization of the product is difficult and the cost of product is increased.

SUMMARY OF THE INVENTION

It is an object of the present invention to provide an optical pickup for recording/reproducing a double-sided disc capable of easily recording/reproducing a double-sided disc on both faces of which signals are recorded.

In order to achieve the above-mentioned object, an optical pickup for recording/reproducing a double-sided disc, comprises

- a first and a second laser sources for generating a first and a second laser beams respectively in order to record/reproduce information recorded on both faces of a double-sided disc;
- a beam splitting means disposed on optical paths of the first and second laser beams, wherein after the first and second laser beams irradiated from the first and second laser diodes are reflected by the beam splitting means, the beams respectively proceed to recording faces of the double-sided disc which are to be disposed opposite to each other with the beam splitting means in the center, and the first and second laser beams respectively reflected by recording faces of the double-sided disc are back reflected by the beam splitting means;
- a first and a second focusing means disposed on optical paths of the first and second laser beams for focusing on the respective recording faces of the double-sided disc; and
- a first and a second receiving means for receiving the first and second beams reflected by the beam splitting means via the double-sided disc in order to record/reproduce information and detect tracking errors and focusing errors.

Furthermore, the first and the second laser sources are spaced out from each other, and the beam splitting means comprises a square pillar-shaped prism. The square pillar-shaped prism is so disposed that a longitudinal direction of the prism is perpendicular to directions of the first and second laser beams irradiated from the first and second laser sources.

The square pillar-shaped prism is so disposed that the recording faces of the double-sided disc are parallel to the longitudinal direction of the square pillar-shaped prism, and the first and second laser beams irradiated from the first and second laser sources are incident with an angle of 45° to two neighboring faces of the longitudinal direction of the square pillar-shaped prism respectively, and reflected from the two faces respectively, and therefore the reflected first and second laser beams proceed to opposite directions from each other.

Meanwhile, each of faces of the square pillar-shaped prism is a total-reflecting face.

Furthermore, an interval between the first and second laser sources is so determined that the first and second laser beams irradiated to the square pillar-shaped prism are incident with an angle of 45° to two neighboring faces of the longitudinal direction of the square pillar-shaped prism respectively, and simultaneously, one half of each laser beam is incident to the square pillar-shaped prism, and the other half of each laser beam proceeds on an outside of the square pillar-shaped prism. Moreover, the first and the second focusing means disposed on the optical paths of the first and second laser beams toward the optical disc via the square pillar-shaped prism are so disposed that centers of the first and second focusing means are aligned with a center of the square pillar-shaped prism.

Thus, the square pillar-shaped prism as the splitting means acts as the knife edge. That is, since only the half of each laser beam which is incident to the square pillar-shaped prism is reflected, and the other half of each laser beam which proceeds on an outside of the square pillar-shaped prism is dropped, only the half of the first and second laser beams is incident to the first and second focusing means and the optical disc. Thus, only the half is received on the first and second receiving means, and thus, the square pillar-shaped prism acts as the knife edge. Meanwhile, each of the first and second receiving means is a two-division photodetector.

As described above, in the optical pickup for recording/reproducing a double-sided disc according to the present invention, the first and second laser beams irradiated from the first and second laser sources are irradiated on both faces of the double-sided disc via the beam splitting means of a particular form, i.e., the square pillar-shaped prism, and thereby information of the double-sided disc is recorded/reproduced. That is, information of the double-sided disc is easily recorded/reproduced by using only the beam splitting means of a particular form without transferring the optical pickup to the upper and lower sides of the disc.

Thus, the construction of the disc player with the optical pickup is simplified and miniaturized.

Furthermore, since the beam splitting means itself functions as the knife edge for detecting tracking error, it needs not to displace a special knife edge. Therefore, the light beam is prevented from being lost due to the special knife edge. Thus, according to the optical pickup of the present invention, a loss of the light beam to be received is minimized, and thereby information of the double-sided disc is recorded/reproduced with high accuracy.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENT

Hereinafter, the preferred embodiment of this invention will be described in detail with reference to the accompanying drawings.

Figure 1:
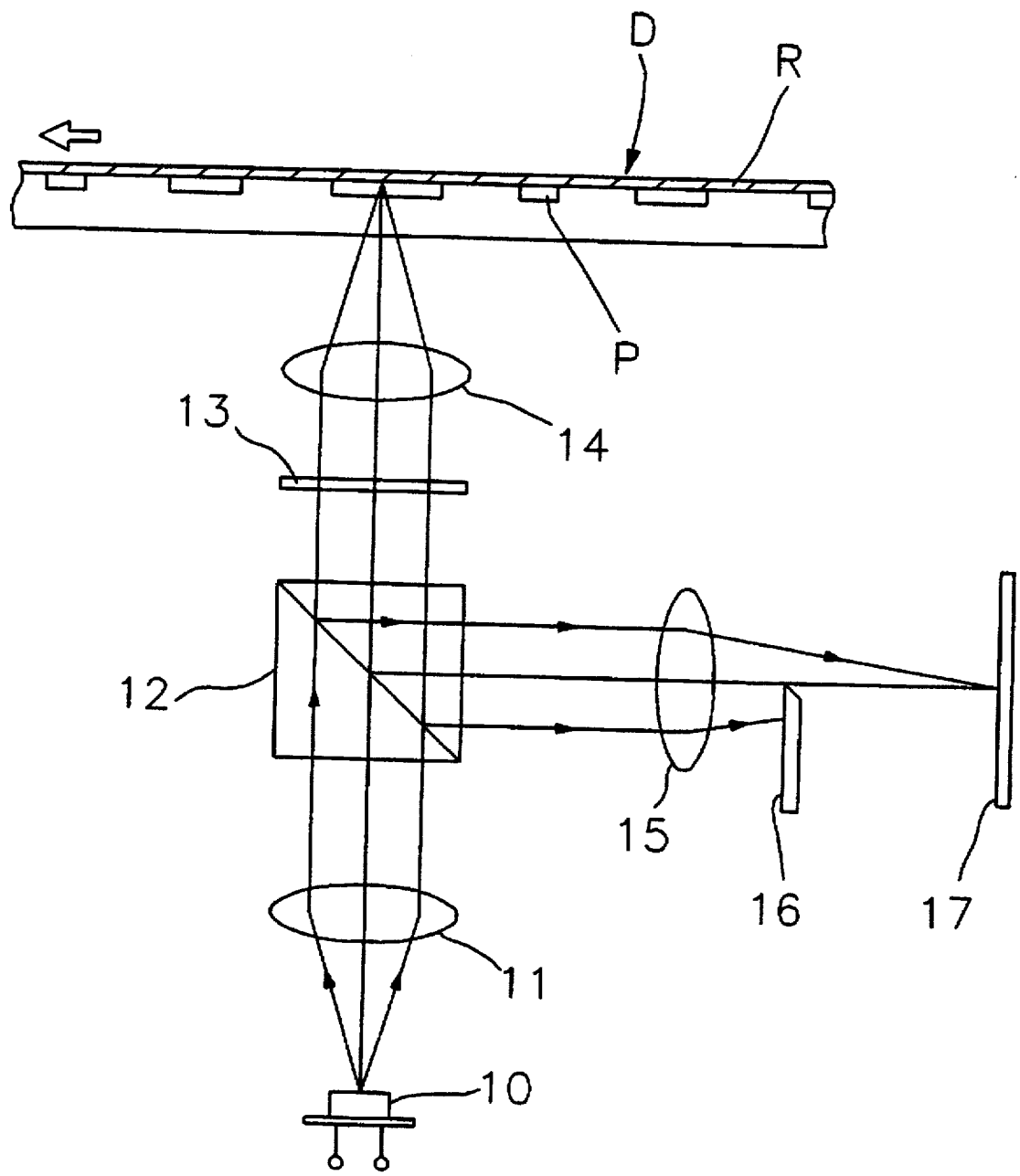
FIG. 1 is a schematic cross-sectional view for showing an optical pickup for recording/reproducing an optical disc according to the prior art.
Figure 2:
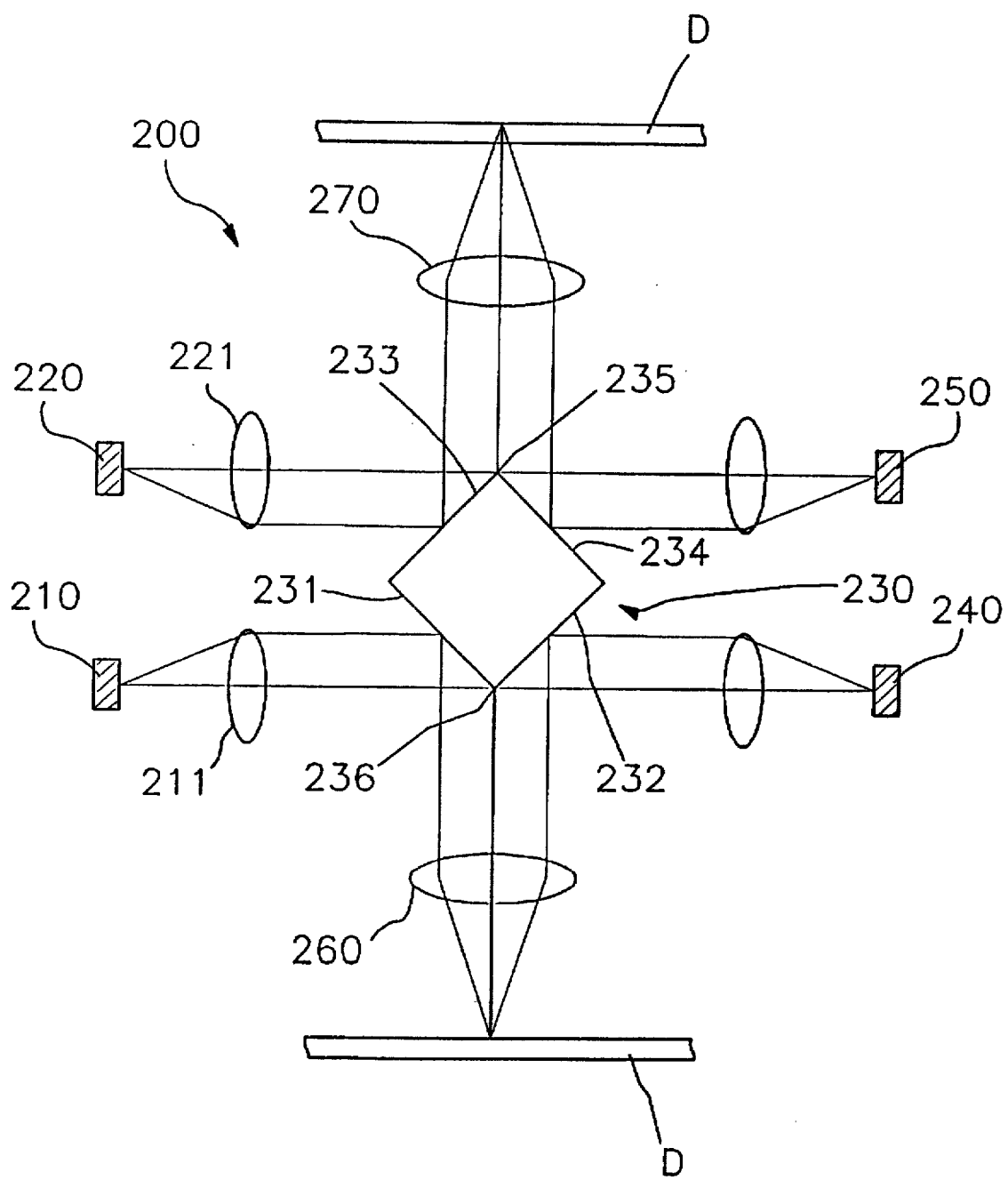
FIG. 2 is a schematic cross-sectional view for showing an optical pickup for recording/reproducing a double-sided disc according to the present invention.

FIG. 2 is a schematic cross-sectional view for showing an optical pickup for recording/reproducing a double-sided disc according to the present invention.

As shown in FIG. 2, in an optical pickup 200 for recording/reproducing a double-sided disc according to the present invention, first and second laser sources 210 and 220 for each generating first and second laser beams are spaced out from each other in order to record/reproduce information recorded on both faces of a double-sided disc D.

The first and second laser beams are irradiated in a parallel direction to each other.

First and second collimator lenses 211 and 220 are disposed on the optical paths of the first and second laser beams, which change the beams respectively into the parallel beams.

A square pillar-shaped prism 230 as beam splitting means is disposed on optical paths of the first and second laser beams. The respective faces of the square pillar-shaped prism 230 are total-reflecting faces 231, 232, 233, and 234. Square pillar-shaped prism 230 is so disposed that its longitudinal direction can be perpendicular to directions of the first and second laser beams irradiated from first and second laser sources 210 and 220. Simultaneously, square pillar-shaped prism 230 is so disposed that the first and second laser beams are respectively incident with an angle of 45° on the two neighboring faces of the longitudinal direction of the square pillar-shaped prism 230, and reflected from the two faces respectively. Square pillar-shaped prism 230 is so disposed that the recording faces of the double-sided disc D are parallel to the longitudinal direction of the square pillar-shaped prism 230. Furthermore, square pillar-shaped prism 230 is so disposed that the first and second laser beams reflected by the prism 230 proceed in the opposite direction from each other toward recording faces of the double-sided disc D which are to be disposed opposite to each other with prism 230 in the center.

An interval between the first and second laser sources 210 and 220 is so determined that the first and second laser beams irradiated to square pillar-shaped prism 230 can be incident with an incident angle of 45° to two neighboring faces of the longitudinal direction of the square pillar-shaped prism respectively, and simultaneously, one half of each laser beam can be incident on square pillar-shaped prism 230, and the other half of each laser beam can proceed on an outside of square pillar-shaped prism 230.

First and second objective lenses 260 and 270 are disposed on optical paths of the first and second laser beams between square pillar-shaped prism 230 and double-sided disc D, and thus, the lens 260 and 270 focus the first and second laser beams on the respective faces of double-sided disc D.

The first and second objective lenses 260 and 270 on the optical paths of the first and second laser beams toward optical disc D via square pillar-shaped prism 230 are disposed such that their centers are aligned with a center of square pillar-shaped prism 230. Simultaneously, two opposite edges 235 and 236 of square pillar-shaped prism 230 are arranged on the line of those centers.

To record/reproduce information and to detect tracking errors and focusing errors, first and second two-division photodetectors 240 and 250 are disposed on the optical paths of the first and second beams totally-reflected by square pillar-shaped prism 230 via double-sided disc D.

Hereinbelow, the operation of the optical pickup for recording/reproducing a double-sided disc according to the present invention will be described.

To begin with, to record/reproduce information recorded on a face of the double-sided disc D, the first laser beam is irradiated from first laser diode 210 toward square pillar-shaped prism 230. The first laser beam is converted into the parallel beam through first collimator lens 211.

The first laser beam is incident with an incident angle of 45° on a face 231 of the longitudinal direction of square pillar-shaped prism 230, and thereafter totally-reflected with a reflecting angle of 45° from the face 231.

The totally-reflected first laser beam is incident on one recording surface of double-sided disc D via first objective lens 260.

The incident first laser beam is reflected from double-sided disc D to be returned to square pillar-shaped prism 230. The returned beam is incident on a face 232 of square pillar-shaped prism 230 and totally-reflected from the face 232. Thus, the beam is received onto first two-division photodetector 240, and thereby, information of the disc is recorded/reproduced and tracking errors and focusing errors are detected.

Here, one half of the first laser beam generated from first laser diode 210, which is incident on the totally-reflecting face 231 of the square pillar-shaped prism 230, proceeds vertically compared to the incident direction, and the other half of the first laser beam generated from first laser diode 210, which proceeds on an outside of edge 236 of the square pillar-shaped prism, is dropped. Thereby, square pillar-shaped prism 230 acts as the knife edge. That is, only the half of the first laser beam which is incident to square pillar-shaped prism 230 is totally-reflected toward disc D, and the other half of the first laser beam which proceeds on an outside of square pillar-shaped prism 230 is dropped, and therefore, only the half of the first laser beam is incident onto optical disc D. Thus, only the half is received on the first two-division photodetector 240, and thereby, square pillar-shaped prism 230 acts as the knife edge.

To record/reproduce information recorded on a face of the double-sided disc D, the case in which the second laser diode 220 is irradiated is similar to the case in which the second laser diode 220 is irradiated.

The second laser beam is irradiated from second laser diode 220 toward square pillar-shaped prism 230. The second laser beam is converted into the parallel beam through second collimator lens 221.

The second laser beam is incident with an incident angle of 45° on a face 233 of the longitudinal direction of square pillar-shaped prism 230, and thereafter totally-reflected with a reflecting angle of 45° from the face 233.

The totally-reflected second laser beam is incident on the other recording surface of double-sided disc D via second objective lens 270.

The incident second laser beam is reflected from double-sided disc D to be returned to square pillar-shaped prism 230. The returned beam is incident on a face 234 of square pillar-shaped prism 230 and totally-reflected from the face 234. Thus, the beam is received onto the second two-division photodetector 250, and thereby, information of the disc is recorded/reproduced and tracking errors and focusing errors are detected.

Here, one half of the second laser beam generated from second laser diode 220, which is incident on the totally-reflecting face 233 of the square pillar-shaped prism 230, proceeds vertically compared to the incident direction, and the other half of the second laser beam generated from second laser diode 220, which proceeds on an outside of edge 235 of the square pillar-shaped prism, is dropped. Thereby, square pillar-shaped prism 230 acts as the knife edge. That is, only the half of the second laser beam which is incident to square pillar-shaped prism 230 is totally-reflected toward disc D, and the other half of the second laser beam which proceeds on an outside of square pillar-shaped prism 230 is dropped, and therefore, only the half of the second laser beam is incident onto optical disc D. Thus, only the half is received on the second two-division photodetector 250, and thereby, square pillar-shaped prism 230 acts as the knife edge.

As described above, in the optical pickup for recording/reproducing a double-sided disc according to the present invention, the first and second laser beams irradiated from the first and second laser sources are irradiated on both faces of the double-sided disc via the beam splitting means of a particular form, i.e., the square pillar-shaped prism, and thereby information of the double-sided disc is recorded/reproduced. That is, information of the double-sided disc is easily recorded/reproduced by using only the beam splitting means of a particular form without transferring the optical pickup to the upper and lower sides of the disc.

Thus, the construction of the disc player with the optical pickup is simplified and miniaturized.

Furthermore, since the beam splitting means itself functions as the knife edge for detecting tracking error, it needs not to displace a special knife edge. Therefore, the light beam is prevented from being lost duce to the special knife edge. Thus, according to the optical pickup of the present invention, a loss of the light beam to be received is minimized, and thereby information of the double-sided disc is recorded/reproduced with high accuracy.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. An optical pickup for recording/reproducing a double-sided disc, comprising:

a first and a second laser sources for generating a first and a second laser beams respectively in order to record/reproduce information recorded on both faces of a double-sided disc;

a beam splitting means disposed on optical paths of the first and second laser beams, wherein after the first and second laser beams irradiated from the first and second laser sources are reflected by the beam splitting means, the beams respectively proceed to recording faces of the double-sided disc which are to be disposed opposite to each other with the beam splitting means in the center, and the first and second laser beams respectively reflected by recording faces of the double-sided disc is back reflected by the beam splitting means;

a first and a second focusing means disposed on optical paths of the first and second laser beams for focusing on the respective recording faces of the double-sided disc;

a first and a second receiving means for receiving the first and seconds beam reflected by the beam splitting means via the double-sided disc in order to record/reproduce information and detect tracking errors and focusing errors.

2. The optical pickup for recording/reproducing a double-sided disc as claimed in claim 1, wherein first and second collimator lenses are disposed between first and second laser sources and the beam splitting means so that the first and the second laser beams are converted into the parallel beams to be incident on the beam splitting means.

3. The optical pickup for recording/reproducing a double-sided disc as claimed in claim 1, the first and second laser sources are spaced out from each other, and the beam splitting means comprises a square pillar-shaped prism, wherein the square pillar-shaped prism is so disposed that a longitudinal direction of the prism is perpendicular to directions of the first and second laser beams irradiated from the first and second laser sources, and the square pillar-shaped prism is so disposed that the recording faces of the double-sided disc are parallel to the longitudinal direction of the square pillar-shaped prism, and the first and second laser beams irradiated from the first and second laser sources are incident with an angle of 45° to two neighboring faces of the longitudinal direction of the square pillar-shaped prism respectively, and reflected from the two faces respectively, and therefore the reflected first and second laser beams proceed to opposite directions from each other.

4. The optical pickup for recording/reproducing a double-sided disc as claimed in claim 3, each of the faces of the square pillar-shaped prism is a total-reflecting face.

5. The optical pickup for recording/reproducing a double-sided disc as claimed in claim 3, an interval between the first and second laser sources is so determined that the first and second laser beams irradiated to the square pillar-shaped prism are incident with an angle of 45° to two neighboring faces of the longitudinal direction of the square pillar-shaped prism respectively, and simultaneously, one half of each laser beam is incident to the square pillar-shaped prism, and the other half of each laser beam proceeds on an outside of the square pillar-shaped prism.

6. The optical pickup for recording/reproducing a double-sided disc as claimed in claim 3, the first and a second focusing means disposed on the optical paths of the first and second laser beams toward the optical disc via the square pillar-shaped prism are so disposed that centers of the first and second focusing means are aligned with a center of the square pillar-shaped prism.

7. The optical pickup for recording/reproducing a double-sided disc as claimed in claim 3, the first and the second receiving means are two-division photodetectors.

8. The optical pickup for recording/reproducing a double-sided disc as claimed in claim 3, wherein first and second collimator lenses are disposed between first and second laser sources and the beam splitting means so that the first and the second laser beams are converted into the parallel beams to be incident on the beam splitting means.

* * * * *